US007204321B2

(12) United States Patent
Agehara et al.

(10) Patent No.: US 7,204,321 B2
(45) Date of Patent: Apr. 17, 2007

(54) CONCRETE DRILL

(75) Inventors: Kigen Agehara, Tokyo (JP); Motoshige Akatsu, Tokyo (JP); Naohide Murakami, Tokyo (JP)

(73) Assignee: Max Co., Ltd., Tokyo (JP)

( * ) Notice: Subject to any disclaimer, the term of this patent is extended or adjusted under 35 U.S.C. 154(b) by 0 days.

(21) Appl. No.: 10/497,722

(22) PCT Filed: Jan. 14, 2003

(86) PCT No.: PCT/JP03/00222

§ 371 (c)(1),
(2), (4) Date: Jun. 4, 2004

(87) PCT Pub. No.: WO03/061928

PCT Pub. Date: Jul. 31, 2003

(65) Prior Publication Data

US 2005/0217900 A1 Oct. 6, 2005

(30) Foreign Application Priority Data

Jan. 18, 2002 (JP) ............................ 2002-010739

(51) Int. Cl.
*B23B 45/16* (2006.01)
*E21B 7/24* (2006.01)

(52) U.S. Cl. ............................ 173/49; 173/48; 173/91; 173/142; 173/144

(58) Field of Classification Search .................. 173/48, 173/142, 144, 16, 49, 90, 91, 97, 100, 200, 173/201

See application file for complete search history.

(56) References Cited

U.S. PATENT DOCUMENTS

| | | | | |
|---|---|---|---|---|
| 4,442,906 | A * | 4/1984 | Simpson | 173/48 |
| 4,711,308 | A * | 12/1987 | Blaas et al. | 173/162.2 |
| 4,895,212 | A * | 1/1990 | Wache | 173/48 |
| 5,476,421 | A * | 12/1995 | Moore et al. | 464/20 |
| 5,692,574 | A * | 12/1997 | Terada | 173/162.2 |
| 5,697,456 | A * | 12/1997 | Radle et al. | 173/162.2 |
| 5,711,379 | A * | 1/1998 | Amano et al. | 173/48 |
| 5,733,074 | A * | 3/1998 | Stock et al. | 408/17 |
| 6,073,705 | A * | 6/2000 | Shibata et al. | 173/200 |
| 6,644,418 | B2 * | 11/2003 | Haga | 173/48 |
| 2001/0037889 | A1 * | 11/2001 | Kristen et al. | 173/200 |

FOREIGN PATENT DOCUMENTS

| | | | |
|---|---|---|---|
| JP | 59-151603 | | 8/1984 |
| JP | 60-61637 | U | 4/1985 |
| JP | 1-260107 | A | 10/1989 |
| JP | 4-82609 | A | 3/1992 |
| JP | 7-308476 | A | 11/1995 |

* cited by examiner

*Primary Examiner*—Brian Nash
(74) *Attorney, Agent, or Firm*—Morgan, Lewis & Bockius LLP

(57) ABSTRACT

A concrete drill for drilling concrete or the like by a diamond bit (5) attached to a front end of a bit drive shaft (4) projected forward from a main body (1) by driving to rotate the bit drive shaft (4) by a drive source (2) contained in the main body (1) in which the main body (1) is provided with a vibrating apparatus (8) for exerting a vibrating force a magnitude which is pulsated to change along the bit drive shaft (4) to the main body (1).

7 Claims, 8 Drawing Sheets

CONCRETE DRILL

The application is based on Japanese Patent Application No. 2002-10739 filed on Jan. 18, 2002 and the content thereof is incorporated herein by reference.

TECHNICAL FIELD

The present invention relates to a concrete drill for boring a hole for attaching an anchor or the like to concrete.

BACKGROUND ART

Currently, there are known a hammer drill and a diamond drill as concrete drills for boring a hole for mounting an anchor to a wall or the like constructed by concrete. A hammer drill subjects concrete to impact fracture to drill by rotating a drill bit attached with a sintered carbide tip at a front end there of while exerting a striking force in an axial direction, a drilling speed is fast, prices of the bit and a concrete drill per se are inexpensive and therefore, a rate of spreading the hammer drill is high, however, there poses a problem that extremely large noise is emitted in operation.

The hammer drill rotates the drill bit and exerts an impulsive striking force and therefore, impact of the drill bit is directly propagated to a wall to vibrate the wall, vibration generated at a room at which operation is carried out is propagated in a wall or the like and propagated to a remote room as structural body propagating sound to emit large noise in a wide range. Therefore, there poses a problem that the hammer drill utilizing impact cannot be used in construction at a living site where living and sale are being carried on as in reforming or the like.

Meanwhile, according to a diamond drill, a front end of a bit in a cylindrical shape is attached with a tip embedded with diamond particles in a metal referred to as metal bond, and drilling is carried out by making the diamonds embedded in the tip at the front end bite concrete to polish by rotating the diamond bit. The size of a single particle of the diamond is about 400 micrometers, a single piece of the bit includes about 1500 particles of the diamond particles, the fine diamond particles cut concrete to drill and therefore, small sound is emitted, structural body propagating sound as in the hammer drill is not emitted, the sound is considerably low at a remote room to enable to carry out construction at a living site.

In the case of the diamond drill, in order to accelerate the driving speed, there is needed a predetermined pressing force for pressing the diamond tip to a concrete face. For example, in boring a large hole having a hole diameter of about 40 mm or larger, a fast drilling speed at low sound is realized by pressing the bit to concrete by fixing a tool of an installed type having a feeding mechanism to a wall face by a small-sized anchor and exerting a large pressing force by the feeding apparatus. Further, in boring a hole of up to about 12 mm, the diamond drill can sufficiently be reduced to practice even by a pressing force to a degree of capable of being pressed to a wall face by an operator although the drilling speed is slightly reduced.

However, the pressing force in pressing the concrete drill to the concrete face unforcibly by the operator is said to be limited to about 15 kgf in the horizontal direction and in the case of an anchor hole having a hole diameter of 16 through 38 mm, a large pressing force larger than 15 kgf is needed. In boring a hole about 16 through 38 mm, an operational time period is not so much prolonged and therefore, the installed type tool having the feed apparatus is not used but a hand-head tool is used, however, the larger the drilling diameter, the larger the contact area of the diamond tip and concrete and therefore, there poses a problem that the drilling speed is retarded since a sufficient pressing force is not exerted to the hand-head tool.

DISCLOSURE OF THE INVENTION

It is a problem of the invention to provide a concrete drill which does not emit structural body propagating sound emitted in drilling by a hammer drill and can make a drilling time period shorter.

In order to resolve the above-described problem, the invention is characterized in a concrete drill for drilling concrete or the like by rotating a drill bit attached to a front end of a bit drive shaft projected forward from a main body by driving to rotate the bit drive shaft by a drive source contained in the main body, wherein a vibrating apparatus for exerting a vibrating force, a magnitude of which is pulsated to change along the bit drive shaft to the main body, is provided at the main body.

Figure 1:
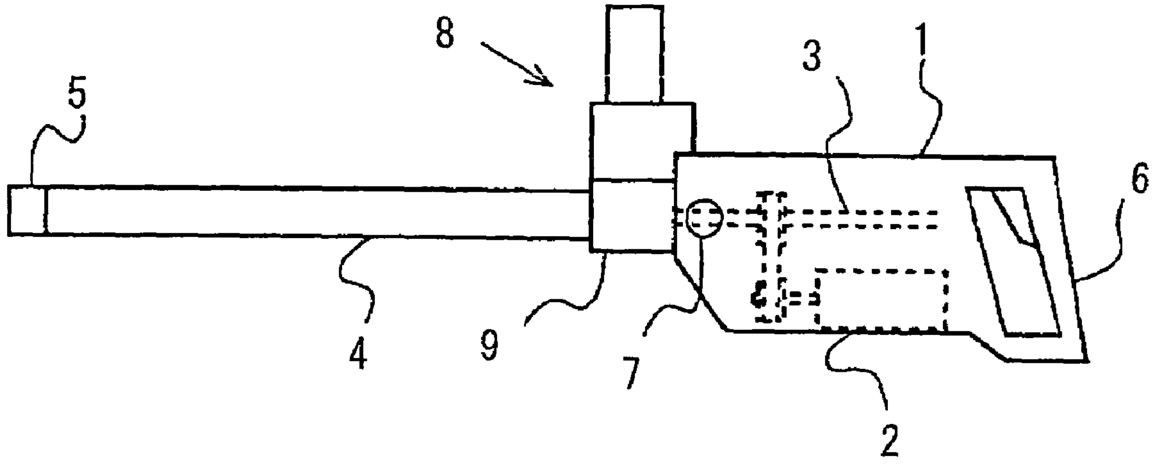
FIG. 1 is a side view of a concrete drill according to an embodiment of the invention.
Figure 2:
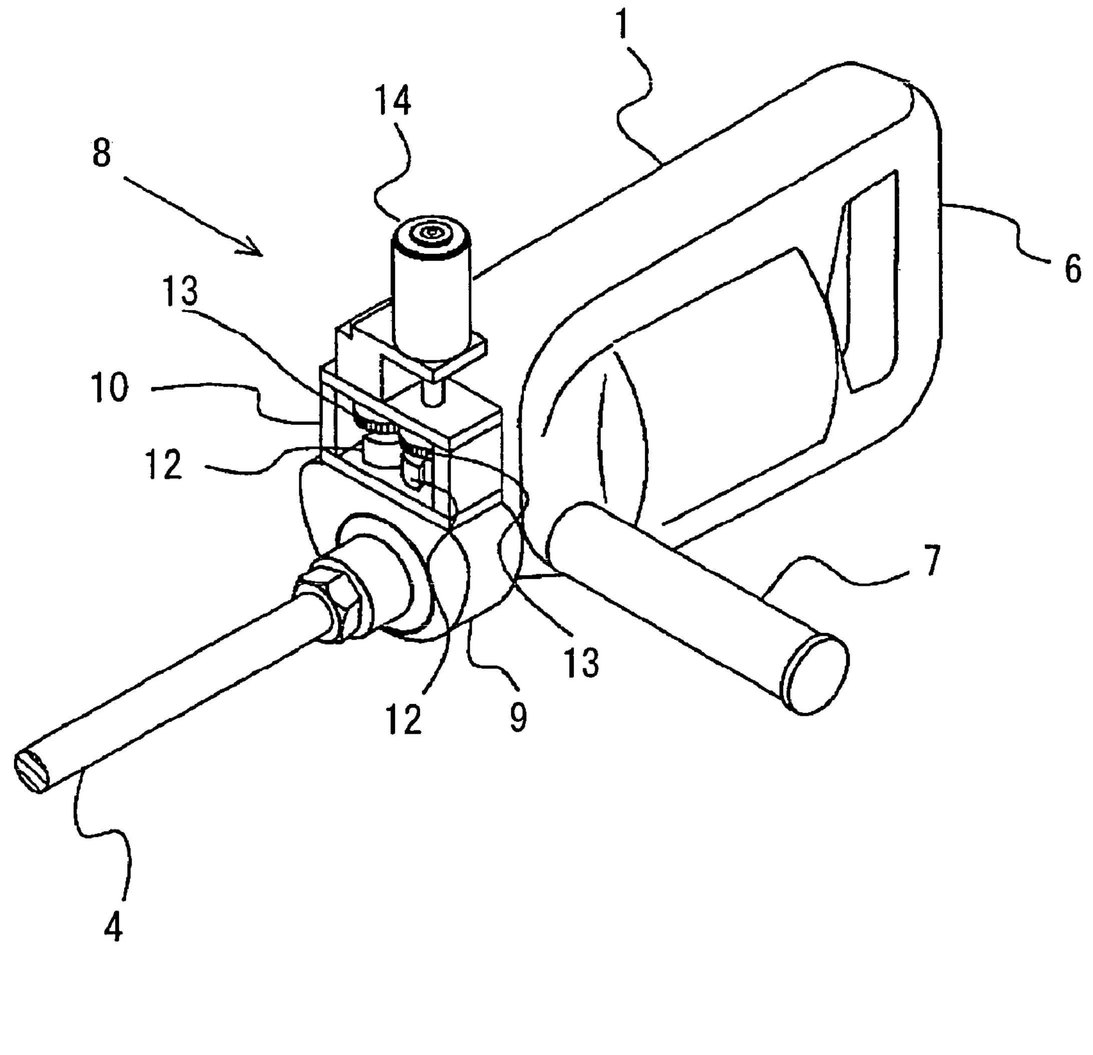
FIG. 2 is a perspective view of a concrete drill the same as that of FIG. 1.

Further, in notations of the drawings, numeral 1 designates a main body, numeral 2 designates a motor, numeral 3 designates a drive shaft, numeral 4 designates a bit drive shaft, numeral 5 designates a diamond bit, numeral 6 designates a grip, numeral 7 designates an auxiliary grip, numeral 8 designates a vibrating apparatus, numeral 9 designates a bracket portion, numeral 10 designates a frame member, numeral 11 designates a rotating shaft, numeral 12 designates an eccentric weight, numeral 13 designates a gear, numeral 14 designates a motor, numeral 15 designates a vibrating apparatus, numeral 16 designates a belt, numeral 17 designates a cylindrical rotating member, numeral 18 designates a spiral groove, numeral 19 designates a weight, numeral 20 designates a projection, numeral 21 designates a vibrating apparatus, numeral 22 designates a guide rod, numeral 23 designates a weight, numeral 24 designates a movable coil, numeral 25 designates a magnet, and numeral 26 designates a damper.

BEST MODE FOR CARRYING OUT THE INVENTION

Figure 4:
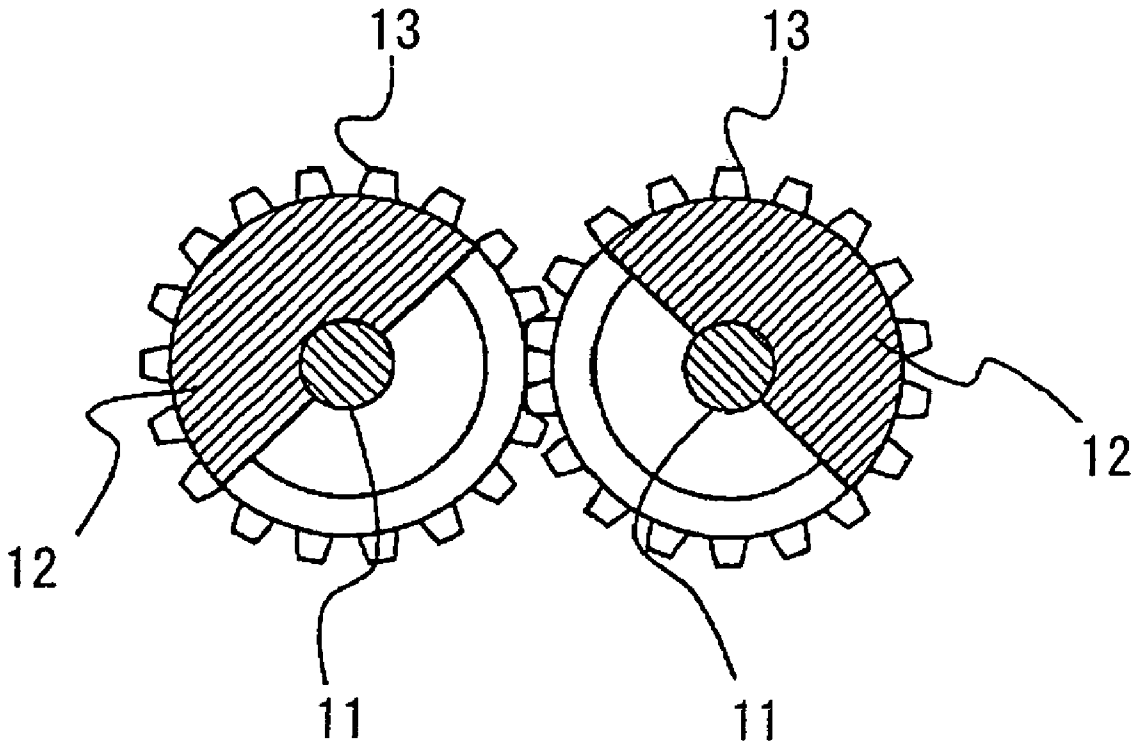
FIG. 4 is a sectional view showing an essential mechanism of the vibrating apparatus of FIG. 3.

An explanation will be given of a mode for carrying out the invention based on embodiments shown in the drawings. FIG. 1 thought FIG. 4 show a concrete drill according to a first embodiment of the invention. The concrete drill drills concrete by rotating the diamond bit 5 attached to a front end of the bit drive shaft 4 projected from a front end of the main body 1 by rotating the bit drive shaft 4 connected to the drive shaft 3 by rotating the drive shaft 3 at inside of the main body 1 by power of the motor 2 contained in the main body 1. An operator presses the diamond bit 5 to a concrete face by grabbing the grip 6 formed at a rear end of the main body 1 and the auxiliary grip 7 provided at a side face of the main body 1.

Figure 3:
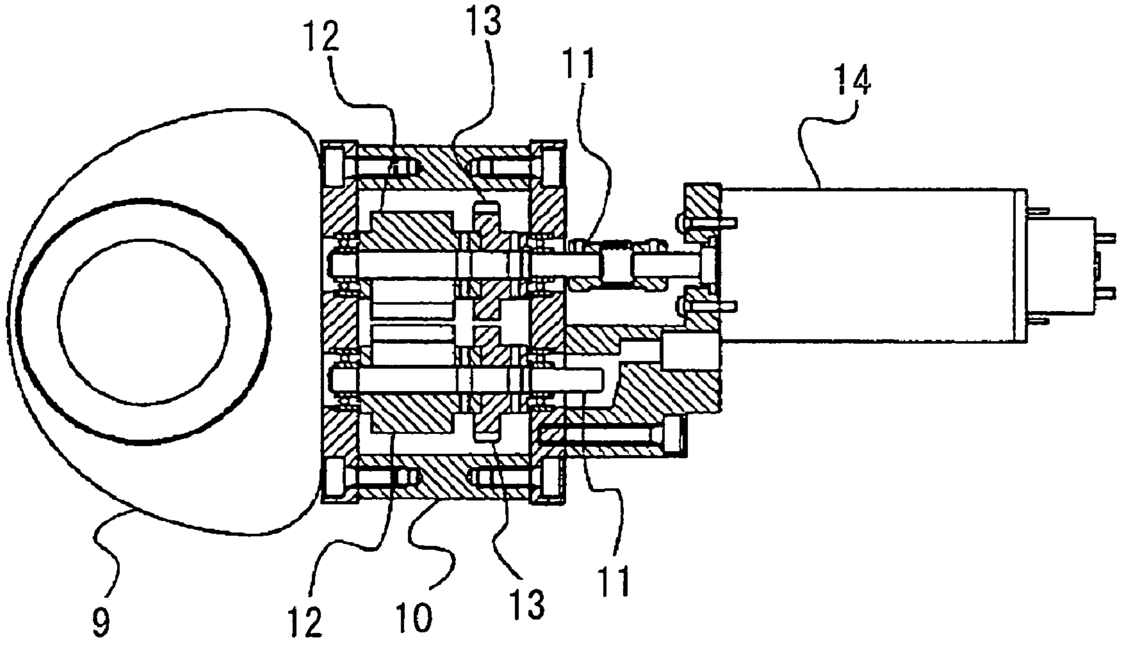
FIG. 3 is a vertical sectional view of a vibrating apparatus of the concrete drill of FIG. 1.

An upper face of a front end portion of the main body 1 is provided with the vibrating apparatus 8 for assisting a pressing force for pressing the diamond bit 5 to the concrete face to thereby generate a pulsating vibration at the main body 1. According to the vibrating apparatus 8, as shown FIG. 3, an upper face of the bracket portion 9 formed at the front end portion of the main body 1 is attached with the frame member 10, and the frame member 10 is formed with two of the rotating shafts 11 arranged in parallel with each other in a direction orthogonal to a direction of extending the bit drive shaft. As shown by FIG. 4, respectives of the rotating shafts 11 are symmetrically attached with the eccentric weights 12. Further, the rotating shafts 11 are attached with the gears 13 brought in mesh with each other and the rotating shafts 11 are rotated in synchronism with each other in directions reverse to each other by gears 13. The motor 14 is connected to an end portion of one of the rotating shafts 11 is connected with the motor 14 and a pulsating vibrating force is exerted to the main body 1 along an axial direction of the bit drive shaft 4 by rotating the eccentric weights 12 attached symmetrically by rotating the respective rotating shafts 11 rotated in the reverse directions by the motor 14.

The pulsating vibrating force generated at the main body 1 is propagated to the diamond bit 5 via the bit drive shaft 4 and operated as a pressing force for pressing the front end of the bit to concrete. The pressing force by the vibrating apparatus 8 is synthesized with a pressing force for pressing the concrete drill to the concrete face by the operator to produce large face pressure between the diamond bit 5 and the concrete face by a larger pressing force. The pressing force is produced by pulsation by the vibrating apparatus 8 and therefore, the press pressure between the diamond bit 5 and the concrete face is pulsatingly changed and chips are evacuated from between the diamond bit 5 and the concrete face to thereby enable to prevent a reduction in a driving function by the chips. It is preferable to set a weight and an outer diameter of the eccentric weight 12 attached to the rotating shaft 11 such that a pulsation of a maximum of about ±30 kgf in term of the pressing force is generated. Further, it is preferable to set a revolution number of the motor 14 such that a frequency of the pulsation becomes about 50 through 300 per minute.

As a result of an experiment of carrying out drilling operation to concrete by a bit having a hole diameter of 16 mm to 36 mm when the operator sets the pressing force for pressing the concrete drill to ±15 kgf and the maximum value of the vibrating force by the eccentric weights 12 by the above-described embodiment to ±30 kgf in comparison with a case in which the vibrating force is not exerted, according to the concrete drill embodying the vibrating apparatus 8 of the invention, in any cases of the hole diameter, an increase in the drilling speed of 50% or more can be confirmed. Meanwhile, it can be confirmed that the structural body propagating sound is less than 60 dB in any of the hole diameters and to degree almost same as that of the concrete drill which does not exert the vibrating force.

According to the above-described embodiment, the motor 14 for operating the vibrating apparatus 8 is arranged separately from the motor 2 for driving the bit and therefore, the vibrating apparatus can be attached to an existing concrete drill which is not provided with a vibrating apparatus to use as a concrete drill having the vibrating apparatus and an efficiency of operation of drilling concrete by utilizing existing concrete drill can be increased.

Figure 5:
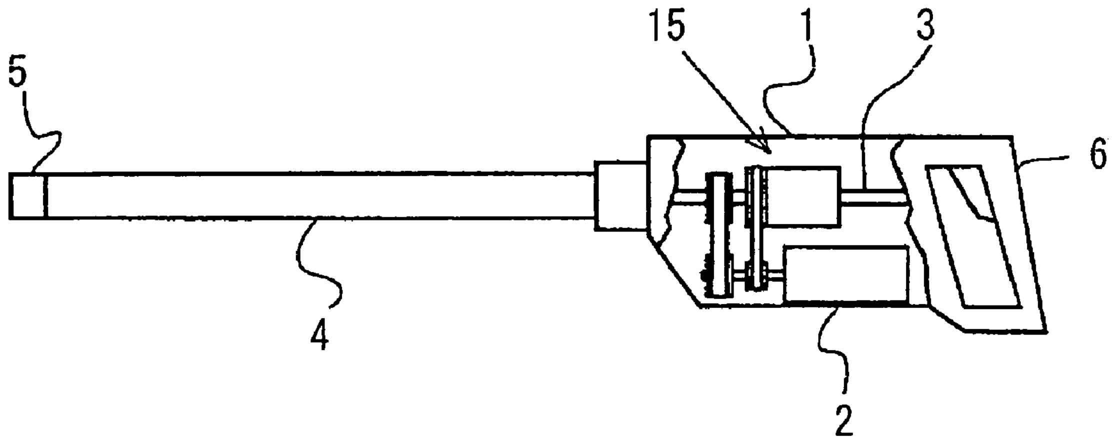
FIG. 5 is a side view of a concrete drill according to other embodiment of the invention.
Figure 6:
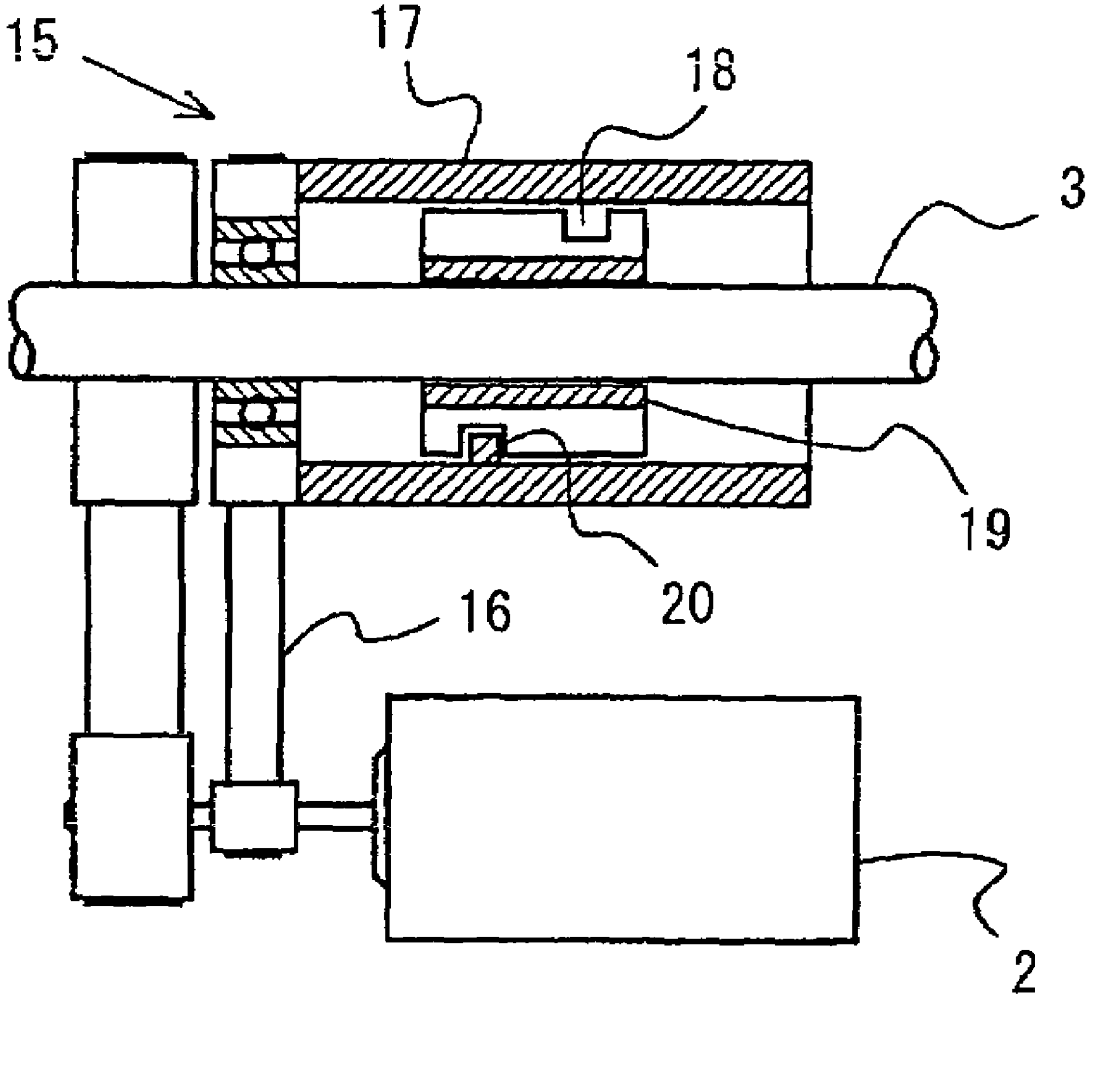
FIG. 6 is a vertical sectional view for a vibrating apparatus of the concrete drill of FIG. 5.

FIG. 5 and FIG. 6 show other embodiment, the vibrating apparatus 15 is included at inside of the main body 1 and is operated by the motor 2 driving to rotate the bit drive shaft 4 via the belt 16. According to the vibrating apparatus 15, the weight 19 formed with the spiral groove 18 at an outer peripheral face thereof in an endless shape is arranged on an inner side of the cylindrical rotating member 17 arranged at inside of the main body 1 slidably in an axis line direction of the drive shaft 3, and the weight 19 is operated to reciprocate by rotating the cylindrical rotating member 17 by loosely fitting the projection 20 formed to project from an inner peripheral face of the cylindrical rotating member 17 to the spiral groove 18. The cylindrical rotating member 17 is connected to the motor 2 by the belt 16 and is made to rotate when the drive shaft 3 is rotated. By rotating the projection 20 by rotating the cylindrical rotating member 17, the weight 19 is driven to reciprocate by the spiral groove 18 along the drive shaft 3 to thereby exert a pulsating vibrating force to the main body 1.

A revolution number of the cylindrical rotating member 17 is set to decelerate such that a frequency of pulsation by the vibrating apparatus 15 becomes about 50 through 300 per minute. According to the above-described embodiment, the vibrating apparatus 15 is operated by utilizing the motor 2 for driving the bit and therefore, it is not necessary to separately provide driving means of a motor or the like for operating the vibrating apparatus and the concrete drill can be downsized.

Figure 7:
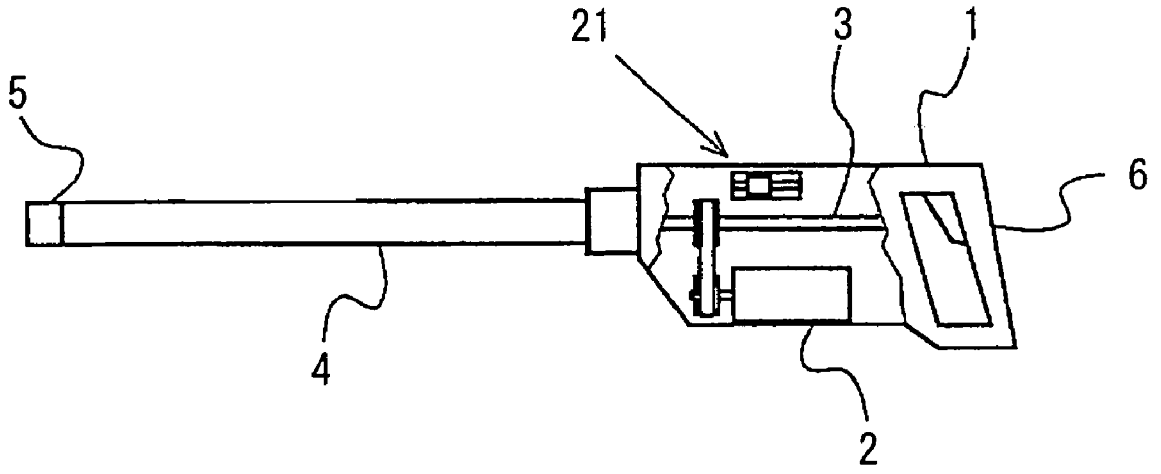
FIG. 7 is a side view of a concrete drill according to still other embodiment of the invention.
Figure 8:
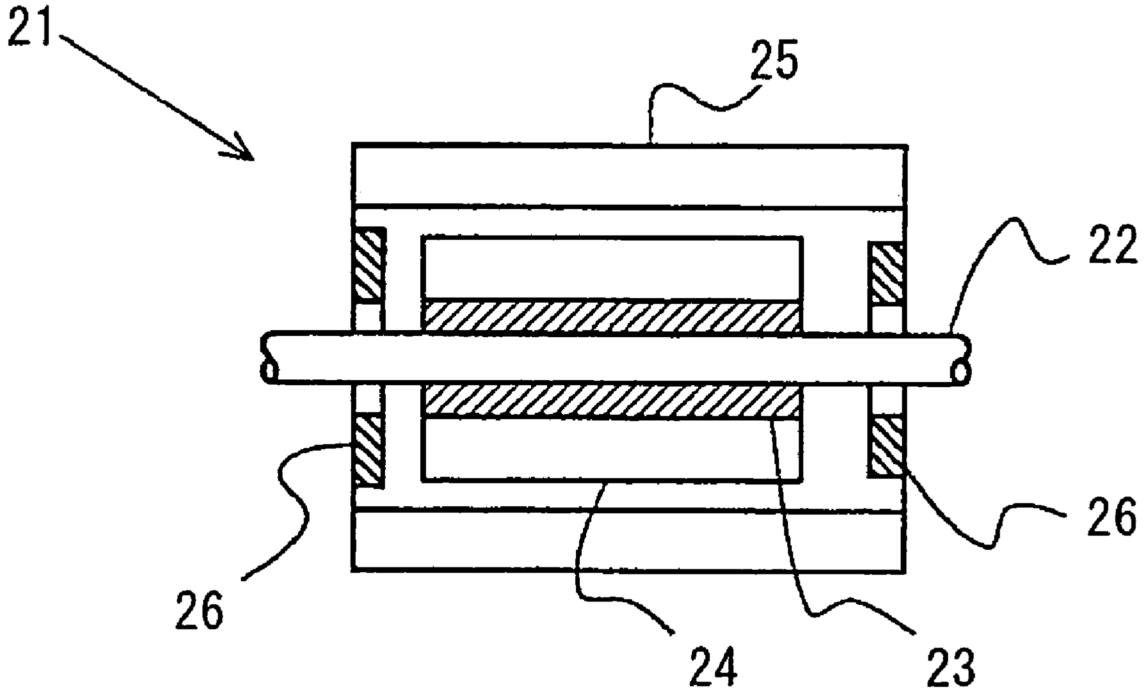
FIG. 8 is a vertical sectional view of a vibrating apparatus of the concrete drill of FIG. 7.

FIG. 7 and FIG. 8 describe still other embodiment, and according to the embodiment, the vibrating apparatus 21 provided with a moving coil movable on a direction in parallel with the bit drive shaft 4 is included in the main body 1. According to the vibrating apparatus 21, the weight 23 is slidably mounted to the guide rod 22 installed in parallel with the drive shaft 3 and the movable coil 24 is integrally formed at an outer periphery of the weight 23. An outer peripheral side of the movable coil 24 is arranged with the magnet 25 by being separated from an outer peripheral face of the movable coil 24 with an interval therebetween and the weight 23 is moved to reciprocate along the guide rod 22 by making alternating current flow to the movable coil 24 to thereby provide vibration of pulsating the main body 1. Further, the dampers 26 are arranged to end portions of reciprocal movement of the weight 23 to thereby prevent the weight 23 from emitting impact sound at the end portions of the reciprocal movement.

Further, a frequency of the alternating current applied to the movable coil 24 may be set such that a frequency of the weight 23 by the vibrating apparatus 21 becomes about 50 through 300 per minute. According to the above-described embodiment, a drive portion constituting the vibrating apparatus 21 is small and therefore, the concrete drill including the vibrating apparatus can further be downsized.

Further, the invention is not limited to the above-described embodiments but can variously be modified or changed and the invention naturally covers the modifications.

INDUSTRIAL APPLICABILITY

As described above, according to the invention, the main body portion of the concrete drill is exerted with the vibrating force along the axial direction of the bit drive shaft and therefore, the pulsatingly changed face pressure can be applied to the concrete face by the diamond bit and thereby, the large pressing force can be produced to supplement the pressing force by the operator, and the fast drilling function can be achieved by preventing a reduction in the function by the chips by pulsating the pressing force. Further, the vibrating force is generated at the main body to thereby exert the face pressure to the diamond bit and therefore, the structural body propagating sound is not emitted as in the hammer drill and therefore, the operation in construction at a living site as in a site of reforming or the like can be carried out.

The invention claimed is:

1. A concrete drill, comprising:

a main body;

a drive source provided in the main body;

a bit drive shaft projected forward from the main body;

a diamond bit attached to a front end of the bit drive shaft; and a vibrating apparatus provided in the main body for exerting a vibrating force along the bit drive shaft to the main body, a magnitude of the vibrating force which is variable, wherein the drive source rotates the diamond bit by driving the bit drive shaft, wherein the vibrating apparatus comprises:

a frame member attached to a bracket portion formed at the main body;

two rotating shafts arranged at the frame member in parallel with each other in a direction orthogonal to a direction of extending the bit drive shaft;

eccentric weights symmetrically attached to respective ones of the rotating shafts;

gears attached to the rotating shafts and brought in mesh with each other;

a motor connected to one of the rotating shafts;

wherein the rotating shafts are rotated by the gears in directions reverse to each other in synchronism with each other; and wherein the vibrating force is exerted to the main body by rotating the eccentric weights by rotating the rotating shafts rotated in the directions reverse to each other by the motor.

2. The concrete drill according to claim 1, wherein a maximum value of the vibrating force exerted along the bit drive shaft to the main body in an upward or downward direction by the vibrating apparatus is 30 kgf.

3. A concrete drill, comprising:

a main body;

a drive source provided in the main body;

a bit drive shaft projected forward from the main body;

a diamond bit attached to a front end of the bit drive shaft; and a vibrating apparatus provided in the main body for exerting a vibrating force along the bit drive shaft to the main body, a magnitude of the vibrating force which is variable, wherein the drive source rotates the diamond bit by driving the bit drive shaft, wherein the vibrating apparatus comprises:

a cylindrical rotating member arranged at an inside of the main body;

a weight arranged on an inner side of the cylindrical rotating member slidably in an axial direction of and mounted to the drive shaft and including a spiral groove at an outer peripheral face of the weight in an endless shape;

a projection formed to project from an inner peripheral face of the cylindrical main body;

wherein the projection is loosely fitted to the spiral groove of the weight, and the groove on the weight is configured such that the rotation of the cylindrical rotating member causes the weight to reciprocate along the drive shaft which causes the vibrating force to be exerted to the main body.

4. The concrete drill according to claim 3, wherein a maximum value of the vibrating force exerted along the bit drive shaft to the main body in an upward or downward direction by the vibrating apparatus is 30 kgf.

5. A concrete drill, comprising:

a main body;

a drive source provided in the main body;

a bit drive shaft projected forward from the main body;

a diamond bit attached to a front end of the bit drive shaft; and a vibrating apparatus provided in the main body for exerting a vibrating force along the bit drive shaft to the main body, a magnitude of the vibrating force which is variable, wherein the drive source rotates the diamond bit by driving the bit drive shaft, wherein the vibrating apparatus comprises:

a guide rod installed in parallel with the drive shaft;

a weight slidably mounted to the guide rod;

a movable coil formed at an outer periphery of the weight, the movable coil being movable together with the weight with respect to the guide rod; and a magnet arranged on an outer peripheral side of the movable coil to be separated from an outer peripheral face of the movable coil with an interval therebetween;

wherein an alternating current is delivered to the movable coil which causes the weight to reciprocate along the guide rod which causes the vibrating force exerted to the main body.

6. The concrete drill according to claim 5, wherein dampers are arranged at end portions of a reciprocal movement of the weight.

7. The concrete drill according to claim 5, wherein a maximum value of the vibrating force exerted along the bit drive shaft to the main body in an upward or downward direction by the vibrating apparatus is 30 kgf.

* * * * *